(12) United States Patent
Larsson

(10) Patent No.: US 6,219,555 B1
(45) Date of Patent: Apr. 17, 2001

(54) TELECOMMUNICATIONS SYSTEM

(76) Inventor: Jarl Larsson, Källvägen 3, 184 51 Österskär (SE)

(*) Notice: Subject to any disclaimer, the term of this patent is extended or adjusted under 35 U.S.C. 154(b) by 0 days.

(21) Appl. No.: 09/051,889

(22) PCT Filed: Oct. 29, 1996

(86) PCT No.: PCT/SE96/01388

§ 371 Date: Apr. 23, 1998

§ 102(e) Date: Apr. 23, 1998

(87) PCT Pub. No.: WO97/16934

PCT Pub. Date: May 9, 1997

(30) Foreign Application Priority Data

Oct. 31, 1995 (SE) ................................................ 9503846-6

(51) Int. Cl.[7] .................................................... H04Q 7/24
(52) U.S. Cl. ........................ 455/456; 455/445; 455/33.1
(58) Field of Search ..................................... 455/456, 33.1, 455/54.1, 445, 509, 511, 54.2; 379/6, 49, 40, 45, 27, 32, 41, 60, 63, 67, 91

(56) References Cited

U.S. PATENT DOCUMENTS

| | | | |
|---|---|---|---|
| 4,740,788 | * | 4/1988 | Konneker ........................ 340/825.44 |
| 4,747,977 | | 5/1988 | Norman . |
| 4,922,514 | * | 5/1990 | Bergeron et al. ........................ 379/6 |
| 5,058,152 | * | 10/1991 | Solomon et al. ........................ 379/67 |
| 5,249,221 | * | 9/1993 | Ketring ................................ 379/214 |
| 5,272,748 | * | 12/1993 | Davis ..................................... 379/63 |
| 5,432,840 | * | 7/1995 | Ryden ..................................... 379/58 |

FOREIGN PATENT DOCUMENTS

| | | | |
|---|---|---|---|
| 0076646 | * | 4/1983 | (EP) ................................ H04Q/3/72 |
| 7604895 | | 7/1978 | (SE) . |
| 89/03106 | * | 6/1989 | (WO) ............................... H04B/7/26 |
| WO 94/14291 | | 6/1994 | (WO) . |

* cited by examiner

Primary Examiner—Daniel Hunter
Assistant Examiner—Pablo Tran
(74) Attorney, Agent, or Firm—Burns, Doane, Swecker & Mathis LLP

(57) ABSTRACT

The invention relates to a telecommunications system that includes a number of calling subscriber apparatus (5), a number of telephone exchange units (1) and a number of called subscriber apparatus (8). The system is adapted to enable a call incoming from a selected permanent system-associated subscriber apparatus or a mobile system-associated subscriber apparatus to be transferred to a selected permanent subscriber apparatus or a selected mobile subscriber apparatus, through the medium of a selected telephone exchange unit and its associated computer equipment. Subsequent to having received a call, the telephone exchange unit (1) and/or the computer equipment (10) establishes or evaluates the geographical area and/or location of the calling subscriber apparatus. The telephone exchange unit and/or the computer equipment evaluates, establishes and stores (104) the geographical areas and/or locations applicable to each of a number of available subscriber apparatus. One of the available subscriber apparatus requested by the calling subscriber and evaluated and indicated, or selected, by the telephone exchange unit is called through the medium of a circuit (105) belonging to the telephone exchange unit. Subsequent to having noted the call from the telephone exchange unit, the indicated subscriber apparatus (8) calls the telephone exchange unit (1) and a connection is set up with the input connection of a second telephone exchange unit through the medium of a telecommunications system and the first and the second input connections are mutually connected by switches in the telephone exchange unit, for direct speech connection.

19 Claims, 2 Drawing Sheets

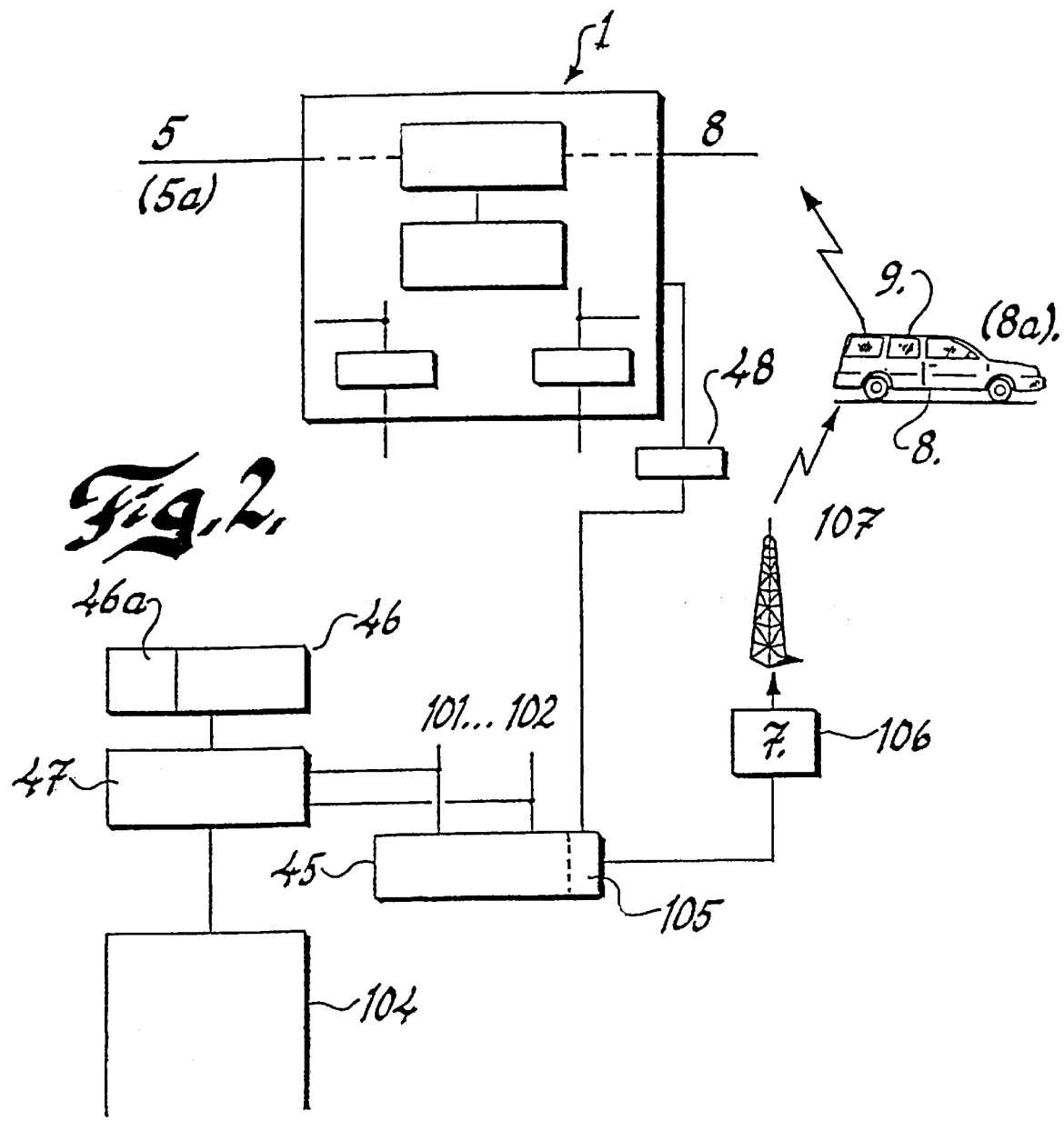

TELECOMMUNICATIONS SYSTEM

FIELD OF INVENTION

The present invention relates to a telecommunications system and more particularly to a telecommunications system that includes a number of subscriber apparatus, a number of telephone exchange units and a number of mobile subscriber apparatus.

Thus, the invention is based on a system with which a call incoming from a chosen permanent subscriber apparatus belonging to the system or from a mobile subscriber apparatus also belonging to the system can be connected to a chosen permanent subscriber apparatus or to a mobile subscriber apparatus with the aid of a special telephone exchange unit or telephone switching unit which preferably includes associated computer equipment.

For the sake of simplicity, the present invention will be described in the following with a starting point from a state in which one of the aforesaid permanent subscriber apparatus functions as a calling subscriber apparatus and one of the aforesaid mobile subscriber apparatus functions as a called subscriber apparatus.

It is also required by the present invention that the telecommunications system has a so-called A-number identification means, wherein each call is accompanied with information concerning the identity of the caller, such as telephone number, therewith enabling the telephone exchange unit and/or computer equipment to evaluate the geographical area and/or position of the permanent subscriber apparatus after each received call, on the basis of this identification.

It is also required by the present invention that the telephone exchange unit and/or the computer equipment included in the telecommunications system is/are able to evaluate and has/have evaluated, established and stored the geographical areas and/or positions applicable to each of a number of available or callable mobile subscriber apparatus.

The special telephone exchange unit shall also include a so-called call transfer function, meaning that a call which is received in a telephone exchange unit on a first input terminal and which, subsequent to evaluation, shall be connected to one of said evaluated, available mobile subscriber apparatus, shall initially be received by a telephone operator or in unattended telephone exchanges or switching centres, to be connectable to a device for connection to a speech generator that includes means for generating and presenting instructions and/or questions to the calling subscriber and, subsequent to evaluating which mobile subscriber apparatus shall be indicated or pointed out, activates means associated with said telephone exchange such as to call the indicated mobile subscriber apparatus, whereafter the telephone operator or said means is released from the connection setup through the exchange or switching centre.

There are used in the following description and Claims such expressions as "permanent system-associated subscriber apparatus". This category of subscriber apparatus does not only include such subscriber apparatus that can be connected to a telephone exchange through a physical telephone line, but also includes other telephone apparatus. However, it is essential to the invention that the telephone apparatus and/or the geographical area of the person, preferably the geographical location of said person, can be established unequivocally.

Also used in the following description is the expression "mobile system-associated subscriber apparatus", by which is meant subscriber apparatus that is allocated to a mobile unit, for instance a taxi cab, express delivery vehicle, mobility service vehicles and like vehicles equipped with mobile telephone equipment, and where it is possible to establish clearly the geographical area and/or the exact location of the unit at any moment in time.

However, in this latter case, the subscriber apparatus may be a permanently connected apparatus. By a permanent subscriber apparatus is meant, in addition to the accepted meaning of the term, a mobile subscriber apparatus which has informed the exchange or switching centre that calls will be received at a particular location, the subscriber apparatus of a taxi rank or like station.

Technicians familiar with this field, however, will be aware of the types of subscriber apparatus that can be used within the two categories aforesaid.

It is also indicated in the description that the "subscriber apparatus" is active by calling and leaving messages, although it will be understood that each such activation is initiated and effected by the person serving the subscriber apparatus concerned.

It will also be understood that the terms "telephone exchange" and "telephone exchange unit" do not refer only to a telephone exchange or a telephone station or switching centre, but also to private branch exchanges, switchboards, private manual branch exchanges and so on.

Although the present invention can be expected to obtain particular application in respect of so-called "taxi telephone exchanges", i.e. a particular telephone exchange unit that is adapted for taxi vehicles where a telephone operator is able to receive calls and provides information regarding the transportation needs of the customer, etc., and where each customer is able to call one single telephone number for a group of taxi cabs, suitably an easily memorized telephone number, it will be understood that the present invention can also be applied to other telephone exchange units and for other purposes.

DESCRIPTION OF THE BACKGROUND ART

With regard to the significant features of the present invention and other features relating thereto, it can be mentioned that there are known to the art different types of telephone exchanges which fulfil the aforesaid basic requirements regarding the function of the present invention.

The call transfer function required by the invention is known to the art and is included in many telephone exchanges, such as operator-manned subscriber exchanges. One such function is based on a facility which, during an on going call between a calling person, a first person, and a called person, a second person, such as a telephone operator, enables the second person to call a third person and transfer the call to this latter person so as to establish a call connection between the first person and the third person called by the second person without the second person being involved in a subsequent call exchange. This call transfer function is initiated by the calling person, the second person, by actuating the keypad of the telephone apparatus in a manner applicable to the telephone exchange concerned.

The second person is then released from the call connection established by the call transfer function directly between the first and the third person.

The AXE subscriber switching network retailed by Telefonaktiebolaget LM Ericsson, Stockholm, Sweden, under the designation "AXE-station" is one example of a telephone exchange that incorporates a call transfer facility.

With regard to the present state of techniques, particular reference can be made to the teachings of U.S. Pat. No. 5,432,840, in which there is described and illustrated a method and an arrangement for selective connection of a permanent subscriber apparatus to nearby mobile subscriber apparatus with the aid of exchange switching functions.

The reader is referred to this American patent publication for a more basic understanding of the present invention and related known techniques.

SUMMARY OF THE INVENTION

TECHNICAL PROBLEMS

When considering the state of the prior art as described above, it will be seen that a technical problem with telecommunications systems of the kind described in the introduction resides in the provision of conditions such that calls and telephone conversations between the telephone exchange unit and a selected available mobile subscriber apparatus can be implemented at low cost on the part of telephone exchange units.

Another technical problem is one of creating conditions with the aid of simple means such that the costs entailed by each call exchange can be transferred from the telephone exchange unit to a called mobile subscriber apparatus selected by the telephone exchange unit.

In this regard, a further technical problem is one of realizing the conditions that must be implemented in order to create circumstances such that the telephone exchange unit is solely able to indicate to a selected, called mobile subscriber apparatus that it has been selected by the telephone exchange unit and that the thus selected mobile subscriber apparatus shall be able immediately to initiate and be charged with the cost of a call to the telephone exchange unit.

It will also be seen that a technical problem resides in the significance of allowing this indication to the selected mobile subscriber apparatus from the telephone exchange unit to take place over a communication path which is separate from a standard telephone connection.

Another technical problem is one of realizing the significance and the simplicity of allowing said indication from the telephone exchange unit to the selected mobile subscriber apparatus to take place over a standard telephone connection, such as a short call that requires no answer, preferably while using an A-subscriber number associated with the telephone exchange, this number being displayed on a subscriber apparatus display.

Another technical problem is one of realizing the significance of allowing an initiated call to be registered in the selected, available mobile subscriber apparatus in a simple manner, and therewith demand the called mobile subscriber apparatus to call the telephone exchange unit.

Another technical problem is to enable with the aid of simple means in telephone exchange units a calling permanent subscriber apparatus to be connected to a calling mobile subscriber apparatus when this latter apparatus calls the telephone unit after a short initiation from the telephone exchange unit.

Another technical problem resides in a) identifying a selected mobile subscriber apparatus within the telephone exchange unit, b) initiating a call that shall not be answered, and c) evaluating the incoming line on which the call from the selected mobile subscriber apparatus is made and connecting these lines together for direct contact therebetween, through the medium of said call transfer function.

It will also be seen that a technical problem is one of realizing the significance of and the advantages that are afforded by allowing a selected mobile subscriber apparatus to call the telephone exchange unit itself and thereby achieve a call setup through the telecommunications system to the telephone exchange unit and be directly connected to the calling permanent subscriber apparatus through the medium of the call transfer function, said call setup being chargeable to the mobile subscriber apparatus.

It will also be seen that a technical problem is one of realizing the significance of allowing the selected communication path between the telephone exchange unit and the mobile subscriber apparatus to comprise a computer connection.

Still a further technical problem in a telecommunications system of the kind described in the introduction is one of offering a predetermined service to a calling subscriber or allowing a calling subscriber to choose an available service or category from among a plurality of available subscriber apparatus.

Another technical problem is one of realizing the significance of creating conditions whereby at least some of the total number of available subscriber apparatus can be coordinated with respect to category in the memory of a telephone exchange.

Still another technical problem is one of creating conditions whereby a calling subscriber apparatus and/or a telephone exchange group number is primarily allocated available subscriber apparatus belonging to a first category.

SOLUTION

With the intention of solving one or more of the aforesaid technical problems, the present invention proposes a telecommunications system which includes a number of subscriber apparatus, a number of telephone exchange units, and a number of mobile subscriber apparatus, in accordance with the definition given in the introduction.

The present invention is based on the ability of said telecommunications system to provide, with the aid of a selected telephone exchange unit and associated computer equipment, a function by means of which a call incoming from a permanent system-associated subscriber apparatus or a mobile system-associated subscriber apparatus can be connected to a selected permanent subscriber apparatus or to a selected mobile subscriber apparatus, wherein one of these apparatus is operative as a calling subscriber apparatus and the other is operative as a called subscriber apparatus.

According to the invention, the telephone exchange unit and/or the computer equipment included in the system shall be adapted so as to be able to establish, after receiving a call, the geographical area and/or the location of the calling subscriber apparatus, and that the telephone exchange unit and/or the computer equipment has evaluated, established and stored at least the geographical areas and/or the locations that apply for each of a number of available, i.e. available, subscriber apparatus, wherein a call received in the telephone exchange unit on a first input connection to one of said evaluated, available subscriber apparatus can be connected to means for connection with a telephone operator, a speech generator or the like, including means for generating instructions and/or questions directed to the calling subscriber.

It is proposed that in a telecommunications system of this kind one of the available subscriber apparatus requested by the calling subscriber and evaluated and indicated by the telephone exchange unit is called through the medium of a circuit belonging to said telephone exchange unit in a manner such that the call can be noted by the called subscriber without said subscriber needing to answer the call, wherein the call can take place over a communication path separate from the telephone connection through the medium of said circuit. It is also proposed that the call can be registered optically and/or acoustically in the indicated, available subscriber apparatus. It is particularly proposed that the indicated, or selected, subscriber apparatus itself calls the actual telephone exchange unit after having noted a call from the circuit of said exchange unit, wherein a standard call setup is established through the telecommunications system with an answer signal to the input connection of a second telephone exchange unit, and wherein said first and said second input connections are interconnected for a direct call connection through the medium of switching means in the telephone exchange unit.

In accordance with proposed embodiments that fall within the concept of the invention, it is proposed that calls between the telephone exchange unit and an indicated, or selected, subscriber apparatus takes place over a communications path that is separate from a standard telephone connection, and that the calling subscriber is a permanent subscriber apparatus and the available subscriber apparatus is a mobile subscriber apparatus, and that the chosen communications path comprises a data connection.

It is also proposed that at least some of the available subscriber apparatus are coordinated in a telephone exchange memory with respect to category.

It is also proposed that a calling subscriber apparatus and/or a telephone exchange group number is primarily allocated to available subscriber apparatus that belong to a first category.

It is also proposed that a calling mobile subscriber apparatus shall be adapted to deliver a code significant to its geographical area or location.

It is also proposed that each of the available mobile subscriber apparatus is adapted to insert into the computer equipment an idle mark or available mark and a code representative of the geographical area or location of said subscriber apparatus at each particular time through the medium of a call setup to the telephone exchange unit.

It is also proposed that each mobile subscriber apparatus is allocated a category and a queue order or line order after having established a connection to the telephone exchange unit.

ADVANTAGES

The primary advantages that are afforded in a telecommunications system in accordance with the present invention reside in the provision of conditions for transferring a relatively expensive telephone call over a mobile telecommunications system from the telephone exchange unit to an available subscriber apparatus selected, or pointed-out, by the telephone exchange unit, therewith dividing the costs that are payable by respective participants for the use of telecommunications services used by respective participants.

In addition, different services can be allocated to calling subscribers, or calling subscribers are able to choose between different available services.

The primary characteristic features of an inventive telecommunications system are set forth in the characterizing clause of the following claim 1.

BRIEF DESCRIPTION OF THE DRAWINGS

An embodiment of a telecommunications system at present preferred and having features significant to the present invention will now be described with reference to the accompanying drawings, in which FIG. 2 is a simplified block schematic that illustrates proposed coaction between functions and facilities included in the telephone exchange and in computer equipment, and having complementarity significant to the present invention.

DETAILED DESCRIPTION OF PROPOSED EMBODIMENTS

Figure 1:
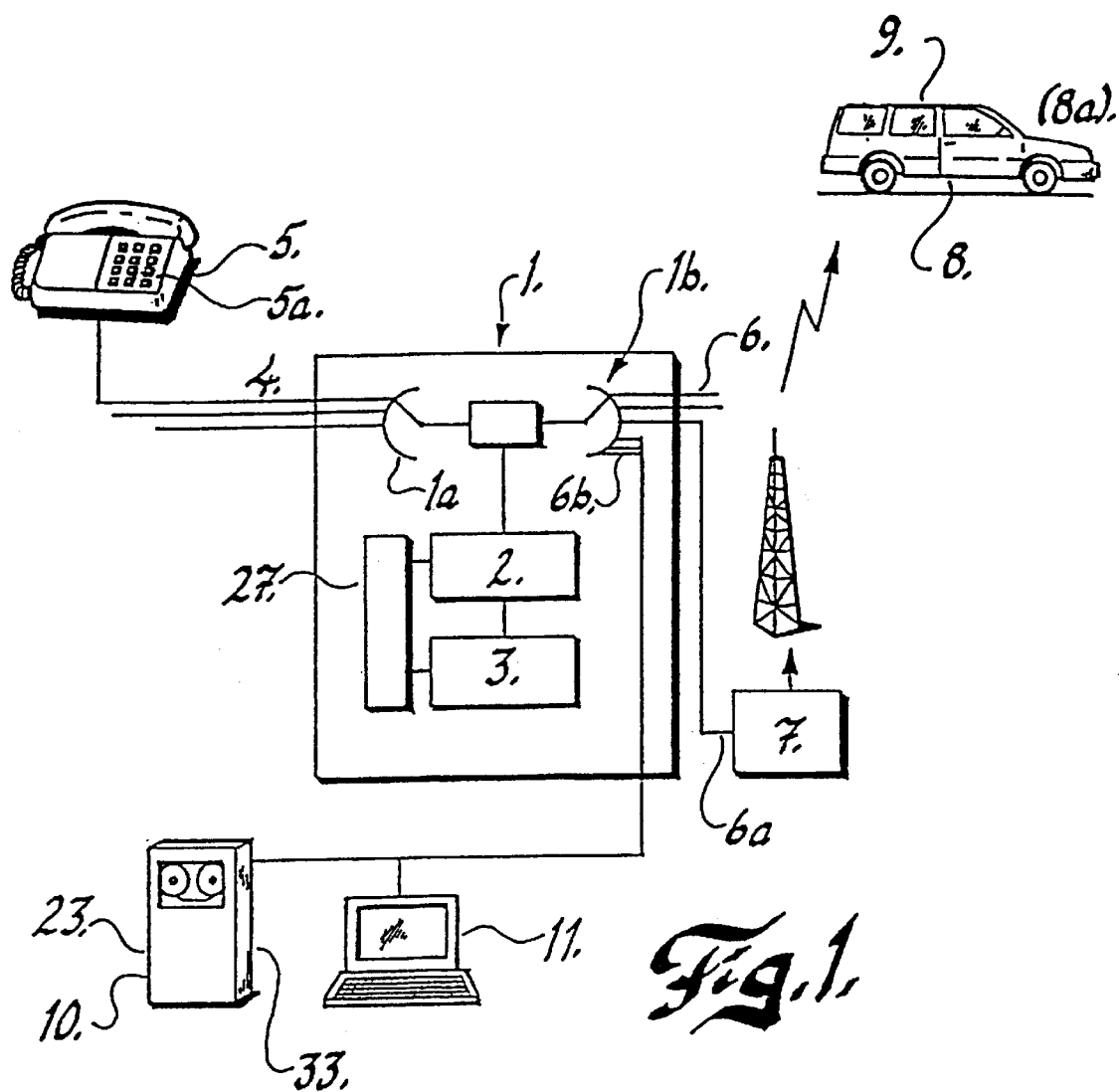
FIG. 1 is a schematic overview of an inventive arrangement which, for the sake of clarity, is shown to include only one permanent subscriber apparatus and only one mobile subscriber apparatus.

FIG. 1 illustrates a telecommunications system which is constructed in accordance with the principles of the invention and which includes a telephone exchange unit in the form of a telephone station 1 provided with the necessary selector devices 1a, 1b for connecting each incoming call to a subscriber chosen by the calling subscriber, either directly or indirectly.

The illustrated embodiment includes the particular case in which each call to a chosen "group number" shall be handled by a special computer apparatus without the aid of a telephone operator.

The telephone exchange 1 includes control equipment 2 and computer equipment and/or system 3 connected to the control equipment by conductors, wherein the control equipment 2 and the computer system 3 coact mutually to activate and execute a chosen through-connection function. This through-connection function is designated "transfer" and is known as an integrated function in telephone stations and telephone exchanges, switching centres, and consequently it is unnecessary to describe this activation and implementation of the transfer function in detail in this document. The invention is based on such activation taking place through the medium of the computer equipment 3.

It suffices to establish in this regard that a call incoming from a person having a permanent subscriber apparatus 5 via a group number and through the medium of coaction with equipment in the telephone exchange is, inter alia, able to influence the transfer function, is connected directly to a mobile subscriber apparatus 9 selected by the computer equipment through the medium of special criteria. The telephone exchange 1 can be connected to a number of permanent system-associated subscriber apparatus with the aid of a number of physical lines 4, of which apparatus only one is shown in FIG. 1 and referenced by numeral 5.

Extending from the telephone exchange 1 is a number of outgoing lines 6, of which a number, 6a, are connected to equipment 7 with whose aid a speech connection can be established with a mobile system-associated subscriber apparatus chosen from among several available apparatus, wherein only one such apparatus is shown. This apparatus is referenced 8 in the drawing.

One of the lines 6 can also be used in accordance with the principles of the intention.

When the subscriber apparatus 5 has activated a "group number", the call will be through-connected to a chosen outgoing line 6b to which computer equipment 10 is connected.

It is assumed that the mobile system-associated subscriber apparatus 8 is mounted in a taxi cab 9, and that the apparatus 8 is manned by a cab driver.

The transfer of a telephone call form the unit 7 to the subscriber apparatus 8 can be effected in a known manner, for instance with the aid of the mobile telephone system NMT900/450 that has been in use in Sweden for many years. The telephone exchange may include equipment, such as computer equipment 10 or may be connected to external equipment, such as computer equipment through the medium of one or more conductors 6b as illustrated in FIG. 1.

The arrangement illustrated in FIG. 1 also includes a queue-organizer 11 that functions to place in a queuing order calls incoming from a number of permanent, simultaneously calling subscriber apparatus 5.

The following description is based on the occurrence of only one call, and consequently the function of the queue-organizer 11 need not be described in detail.

A stationary subscriber apparatus 5 can be connected selectively to a nearby subscriber apparatus 8 chosen by the computer equipment with the aid of said telephone exchange and computer equipment 10 coacting therewith, even when the permanent subscriber apparatus activates a call to a given group number.

In order for this to be possible, it is necessary for a telephone exchange 1 to connect all incoming calls directed to said given group number to the computer equipment 10 which includes devices and means which, subsequent to establishing a call connection between the permanent subscriber apparatus 5 and the computer equipment 10, function to generate artificial speech and compile questions and, in accordance with the answers given, establish the geographical area and/or the place in which the permanent subscriber apparatus 5 is located.

This can be achieved by requesting the permanent subscriber apparatus 5 to key-in the first two digits of its own telephone number, for instance through the medium of its keypad 5a, said code being able to establish the geographical area in which the subscriber apparatus is located through the medium of means (not shown) connected to a device (not shown).

Alternatively, the permanent subscriber apparatus 5 may be requested to key-in the post code or zip code of the geographical area concerned.

According to one variant, which is most preferred, the telephone exchange 1 is able to evaluate the number (A-number identification) of the calling subscriber apparatus 5 in coaction with the computer equipment 10, and to establish the location and also the address of the subscriber apparatus through the medium of said computer equipment.

The present invention is thus based on the ability to evaluate the location and the address of the subscriber apparatus, and also on the ability of establishing the locations and possible addresses of available subscriber apparatus and storing this information in the telephone exchange unit, and on the ability of the telephone exchange unit to transfer the call of a calling subscriber apparatus 5 to a selected called subscriber apparatus 8.

Reference is made to the aforementioned American patent application for a clearer understanding of suitable switching arrangements in this respect, and then particularly to the embodiment described with reference to and illustrated in FIG. 3.

With reference to FIG. 2, there is shown in a simplified manner solely certain switching/technical functions, and signals that correspond to the geographical area or location of a calling subscriber apparatus 5 occur on a line or conductor 101, and each of the available subscriber apparatus 8 connected to the telecommunications system enter their momentary geographical area and/or location on a conductor or line 102, wherein data concerning available subscriber apparatus 8 is stored in a queuing device 104.

The illustrated embodiment is intended to show that each incoming call 5 having A-number identification is stored in a memory 46.

This memory 46 also indicates incoming lines to the telephone exchange, A-number identification, and, at the same time, checks in a memory 46a whether or not the A-number has certain limitations or belongs to certain categories.

The limitations may, primarily, be to search for an available taxi cab from among a number of "inexpensive" or contracted cabs. The category may be that the A-number requires a handicap vehicle that includes wheelchair facilities.

A suitable taxi cab placed in the queue organizer 104 is then indicated by equipment 47.

The queue organizer 104 is also divided into areas or regions, so that all available taxi cabs within an area having "limitations" and/or category membership will be stored within its respective relevant area.

Subsequent to the equipment 47 having indicated an available and appropriate taxi cab, a connection is set up from the telephone exchange to the selected taxi cab.

It is fundamental to the inventive system that one of the telephone apparatus indicated indirectly by the calling person 5 and by the telephone exchange unit 10 is evaluated and that the indicated, available subscriber apparatus 8 is now called through the medium of a circuit 105 belonging to the telephone exchange unit, through the medium of a transmitter 106.

The identity of the selected taxi cab is now stored in a memory 48 together with information relating to the incoming line concerned.

It is also fundamental to the invention that this call shall only need to load the telephone exchange unit with low costs or with no cost at all, since the costs involved through the telephone exchange must all be distributed equally between the system subscribers. This would seem to be the only practical possibility, irrespective of whether an individual subscriber utilizes the system or not.

In this regard, it is proposed in accordance with the invention that although the telephone exchange unit makes a call to a selected taxi cab, the circuit 105 will be adapted so that when the connection is established and the A-number of the telephone exchange has been sent to the taxi cab 8, this number will represent an "indication" to the chosen subscriber, either optically or acoustically, that the subscriber 8 shall call the telephone exchange unit 1 immediately.

So that this "indication" can be made without cost to the telephone exchange unit, it is proposed that a call established over the available telephone system shall only be noted by the called subscriber and without the called subscriber answering or needing to answer the call.

This indication can be given through the medium of an optical signal and/or by displaying the telephone number (A-number) of the telephone exchange unit on the display of the calling subscriber apparatus.

Alternatively, the call can be made over a communications path 107 separate from the telephone connection and having the form of a data connection.

This short call is therewith registerable in the indicated called subscriber apparatus 8 and the call provides only an acoustic and/or optical indication on the subscriber apparatus, namely an indication that the subscriber apparatus shall call the telephone exchange unit immediately.

The indicated subscriber apparatus 8 then calls the telephone exchange unit 1 via a telephone connection established through the telecommunications system, and telephone communication is then established with the input connection of a second telephone exchange unit.

When said call arrives at the second input connection and the A-number identification associated therewith is read from the memory 48 to which other input connection (the first) the call shall be connected, and the call transfer function can effect the call transfer so that the calling subscriber 5 and the called subscriber 8 have direct speech contact.

Thus, the first and the second input connections are mutually connected by switches in the telephone exchange unit, so as to achieve direct call connection between said subscriber apparatus while releasing the calling telephone exchange unit.

According to the present invention, at least some of the available subscriber apparatus 8 are coordinated with respect to category in a memory 104 of the telephone exchange unit.

A calling subscriber apparatus and/or a telephone exchange group number is primarily allocated available subscriber apparatus belonging to a first category.

Each of the available mobile subscriber apparatus is adapted to insert into the computer equipment an available mark and a code that reveals its immediate geographical area or geographical location, through its own connection with the telephone exchange unit.

Subsequent to establishing a connection, each mobile subscriber apparatus will be allocated a category and a queue order in the memory 104.

The telephone exchange unit and/or the computer equipment may conveniently utilize means for, inter alia, generating artificial speech which presents certain instructions and questions to the calling subscriber and stores his/her messages and answers.

Desired times, etc., are also inserted in the telephone exchange unit and/or computer equipment, so as to be able to deal with pre-bookings or pre-reservations made by a calling subscriber apparatus and to activate a call over the communications path from the telephone exchange and/or its computer equipment to a selected called subscriber apparatus prior to the time chosen, said called subscriber apparatus being permitted to call the telephone exchange unit via the telecommunications system.

The special features significant to the present invention will now be explained in more detail by way of example.

It is assumed that a number of taxi cabs charge low fares. These cabs are then sorted in a queuing order in the memory under the category "low fare rated".

It is also assumed that a number of taxi cabs are station wagons, or estate cars. These cabs are then sorted in the memory under the category "station wagon types", and so on.

There is nothing to prevent respective cabs being coded in their relevant categories.

It is also assumed that a number of taxi cabs are adapted to accommodate handicapped persons. This type of cab is then sorted in a queue order under the category "handicap adapted".

It is also assumed that a number of taxi cabs can accommodate up to seven passengers. These cabs are then sorted in a queue order under the category "up to seven", and so on.

One and the same taxi cab can thus be sorted in several categories and in several relevant areas.

If a calling subscriber is restricted to choosing solely "handicap adapted", the telephone exchange unit shall thus choose a cab from among this category, and then the nearest cab.

It also falls within the scope of the invention that chain stores, for instance, may have a telephone exchange group number and that all incoming calls to this group number shall be switched by the telephone exchange to the nearest store in the aforedescribed manner.

The separate communications channel may be a data link, such as a short message service, SMS, or a person-paging system that includes written messages, or alternative the mobile GSM system.

It will be understood that the invention is not restricted to the aforedescribed and illustrated exemplifying embodiment thereof and that modifications can be made within the scope of the inventive concept as defined in the following Claims.

What is claimed is:

1. A telecommunication system, comprising:
   at least one subscriber apparatus;
   at least one telephone exchange unit;
   at least one mobile subscriber unit;
   a computer;
   wherein the telecommunication system is adapted to provide, with the aid of a selected telephone exchange unit and said computer, a function by means of which a call incoming from a subscriber apparatus or a mobile subscriber unit can be connected to a selected subscriber apparatus or to a selected mobile subscriber apparatus;
   wherein one of the subscriber apparatus or mobile apparatus is operative as a calling subscriber apparatus and the other is operative as a called subscriber apparatus;
   wherein after receiving a call the telephone exchange unit or the computer establishes or evaluates the geographical area and the location of the calling subscriber apparatus, and the telephone exchange unit or the computer evaluates, establishes, and stores at least the geographical areas and the locations that apply for each available subscriber apparatus;
   wherein a call received in the telephone exchange unit on a first input connection to one of said evaluated, available subscriber apparatus can be connected to a telephone operator, a speech generator or device that generates instructions and questions directed to the calling subscriber;
   wherein one of the available subscriber apparatus indicated by the calling subscriber and evaluated by the telephone exchange unit is called through the medium of a circuit belonging to the telephone exchange unit, the call being of such a short duration that the called subscriber does not answer;
   wherein after having noted the call from the telephone exchange unit, the indicated subscriber apparatus calls the telephone exchange unit and a connection is established with a second input connection of said telephone exchange unit through the medium of the telecommunications system; and
   wherein the first and second input connections are mutually connected through the medium of switches in the telephone exchange unit for direct call connection.

2. A system according to claim 1, wherein said call takes place over a communications path that is separate from a standard telephone connection.

3. A system according to claim 2, wherein the telephone exchange unit and the computer equipment utilize means for, inter alia, generating artificial speech which presents certain instructions and messages to the calling subscriber and stores his/her messages and answers.

4. A system according to claim 1, wherein the call can be registered optically in the called subscriber apparatus.

5. A system according to claim 4, wherein the identification of the telephone exchange unit is visible on the display of a subscriber apparatus.

6. A system according to claim 5, wherein the telephone exchange unit and the computer equipment utilize means for, inter alia, generating artificial speech which presents certain instructions and messages to the calling subscriber and stores his/her messages and answers.

7. A system according to claim 4, wherein the telephone exchange unit and the computer equipment utilize means for, inter alia, generating artificial speech which presents certain instructions and messages to the calling subscriber and stores his/her messages and answers.

8. A system according to claim 1, wherein the call can be registered acoustically.

9. A system according to claim 1, wherein the calling subscriber is a permanent subscriber apparatus and the available subscriber apparatus is a mobile subscriber apparatus; and in that the communications path constitutes a data connection.

10. A system according to claim 9, wherein at least some of the available subscriber apparatus are coordinated with respect to category in a telephone exchange memory.

11. A system according to claim 10, wherein a calling subscriber apparatus and a telephone exchange group number is primarily allocated available subscriber apparatus that belong to a defined category.

12. A system according to claim 1, wherein at least some of the available subscriber apparatus are coordinated with respect to category in a telephone exchange memory.

13. A system according to claim 12, wherein a calling subscriber apparatus or a telephone exchange group number is primarily allocated available subscriber apparatus that belong to a defined category.

14. A system according to claim 1, wherein a calling mobile subscriber apparatus is adapted to present a code significant to its area or location.

15. A system according to claim 1, wherein each of the available mobile subscriber apparatus is adapted to enter in the computer equipment an available or idle mark and a code that discloses the immediate geographical area or location of said subscriber apparatus, through the medium of a connection with the telephone exchange unit.

16. A system according to claim 15, wherein subsequent to establishing said connection, each mobile subscriber apparatus is allocated a category and a queue order.

17. A system according to claim 1, wherein the telephone exchange unit or the computer equipment utilize means for, inter alia, generating artificial speech which presents certain instructions and messages to the calling subscriber and stores his/her messages and answers.

18. A system according to claim 1, wherein desired times, etc., of a pre-booking requested by a calling subscriber apparatus is entered into the telephone exchange unit and the computer equipment; and in that a call is activated over the communications path from the telephone exchange or its computer equipment to a selected called subscriber apparatus prior to said chosen time, said called subscriber apparatus calling the telephone exchange unit via the telecommunications system.

19. A system according to claim 1, wherein the telephone exchange unit and the computer equipment utilize means for, inter alia, generating artificial speech which presents certain instructions and messages to the calling subscriber and stores his/her messages and answers.

\* \* \* \* \*